United States Patent
Shao et al.

(10) Patent No.: US 11,738,462 B2
(45) Date of Patent: Aug. 29, 2023

(54) COORDINATE CALIBRATION METHOD OF MANIPULATOR

(71) Applicant: Delta Electronics, Inc., Taoyuan (TW)

(72) Inventors: Chi-Huan Shao, Taoyuan (TW); Chi-Shun Chang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 205 days.

(21) Appl. No.: 17/323,935

(22) Filed: May 18, 2021

(65) Prior Publication Data
US 2021/0387345 A1    Dec. 16, 2021

(30) Foreign Application Priority Data
Jun. 11, 2020   (CN) .......................... 202010528712.6

(51) Int. Cl.
| | |
|---|---|
| *B25J 9/16* | (2006.01) |
| *B25J 13/08* | (2006.01) |
| *B25J 9/02* | (2006.01) |

(52) U.S. Cl.
CPC ............ *B25J 9/1692* (2013.01); *B25J 9/023* (2013.01); *B25J 9/1607* (2013.01); *B25J 9/1615* (2013.01); *B25J 9/1664* (2013.01); *B25J 13/089* (2013.01)

(58) Field of Classification Search
CPC ........ B25J 9/1692; B25J 9/023; B25J 9/1607; B25J 9/1615; B25J 9/1664; B25J 13/089;
(Continued)

(56) References Cited

U.S. PATENT DOCUMENTS

| 8,457,786 B2 | 6/2013 | Andersson |
| 10,065,319 B2 | 9/2018 | Huang et al. |

(Continued)

FOREIGN PATENT DOCUMENTS

| CN | 102151866 A | 8/2011 |
| CN | 102458779 A | 5/2012 |

(Continued)

*Primary Examiner* — Jonathan L Sample
*Assistant Examiner* — Byron Xavier Kasper
(74) *Attorney, Agent, or Firm* — KIRTON McCONKIE; Evan R. Witt

(57) ABSTRACT

A coordinate calibration method of a manipulator is provided and includes steps of: (a) controlling the manipulator to move in accordance with a movement command, and acquiring the reference anchor points reached by the manipulator; (b) acquiring a rotation matrix and a translation vector according to the reference anchor points, and acquiring a reference coordinate system accordingly; (c) when the manipulator returning to the work space after temporarily leaving, controlling the manipulator to move in accordance with the movement command, and acquiring the actual anchor points reached by the manipulator; (d) acquiring a rotation matrix and a translation vector according to the actual anchor points, acquiring a corresponding actual coordinate system accordingly, and acquiring a coordinate compensation information by comparing the rotation matrixes and the translation vectors; and (e) adjusting the manipulator according to the coordinate compensation information, and maintaining the manipulator to operate in the reference coordinate system.

9 Claims, 3 Drawing Sheets

(58) Field of Classification Search
CPC ....... B25J 5/00; B25J 5/007; B25J 9/02; B25J 9/04; B25J 9/00; G05B 2219/39024
See application file for complete search history.

(56) References Cited

U.S. PATENT DOCUMENTS

| | | | | |
|---|---|---|---|---|
| 2006/0117587 A1* | 6/2006 | Lotze | .................... | G01B 21/045 33/559 |
| 2015/0314450 A1* | 11/2015 | Chiu | ...................... | B25J 9/1692 700/186 |
| 2017/0231702 A1* | 8/2017 | Crawford | ............... | A61B 34/25 700/254 |
| 2018/0222049 A1* | 8/2018 | Suzuki | ................... | B25J 9/1612 |
| 2019/0381668 A1 | 12/2019 | Huang et al. | | |

FOREIGN PATENT DOCUMENTS

| | | | | |
|---|---|---|---|---|
| CN | 103009392 A | | 4/2013 | |
| CN | 104339352 A | | 2/2015 | |
| CN | 105073348 A | | 11/2015 | |
| CN | 106808483 A | | 6/2017 | |
| CN | 108161935 A | | 6/2018 | |
| CN | 108453701 A | * | 8/2018 | .............. B25J 13/00 |
| CN | 109443206 A | | 3/2019 | |
| CN | 110487233 A | | 11/2019 | |
| EP | 0547926 A1 | | 11/1992 | |
| EP | 2322897 A1 | | 5/2011 | |
| JP | 2006098065 A | | 4/2006 | |
| JP | 2015033747 A | | 2/2015 | |
| JP | 2018126835 A | * | 8/2018 | .......... B25J 15/0014 |
| TW | 201223724 A | | 6/2012 | |
| TW | I668541 B | | 8/2019 | |
| WO | WO-2009132703 A1 | * | 11/2009 | ............ B25J 9/1692 |
| WO | WO-2011113490 A1 | * | 9/2011 | ............ B25J 9/1692 |

* cited by examiner

COORDINATE CALIBRATION METHOD OF MANIPULATOR

CROSS-REFERENCE TO RELATED APPLICATION

This application claims priority to China Patent Application No. 202010528712.6, filed on Jun. 11, 2020. The entire contents of the above-mentioned patent applications are incorporated herein by reference for all purposes.

FIELD OF THE INVENTION

The present disclosure relates to a coordinate calibration method, and more particularly to a coordinate calibration method of a manipulator.

BACKGROUND OF THE INVENTION

Nowadays, robots are widely used in various industries. The robot may be moved to and fro among different areas or work stations by a carrier rather than operating in a certain work station constantly. Under this circumstance, if the robot is moved to any one of the work stations, it is required to create coordinate system and teach points again for ensuring the work precision. However, repeatedly creating coordinate system and teaching points takes a lot of time, which leads to a reduction of work efficiency. Moreover, it is difficult to ensure that the created coordinates systems in the same work station are exactly the same, which may decrease the work precision of robot.

Therefore, there is a need of providing a coordinate calibration method of a manipulator to obviate the drawbacks encountered from the prior arts.

SUMMARY OF THE INVENTION

It is an objective of the present disclosure to provide a coordinate calibration method of a manipulator. A reference coordinate system of a work space is created through a 3D measuring device. When the manipulator returns to the work space after temporarily leaving, an actual coordinate system is acquired through the 3D measuring device. The manipulator is adjusted according to the difference between the reference coordinate system and the actual coordinate system so that the manipulator is maintained to operate in the reference coordinate system. Accordingly, the coordinate system needs not to be created repeatedly, and the manipulator needs not to be taught points repeatedly either. Consequently, the work efficiency of the manipulator is greatly improved. Moreover, since the manipulator operates in the reference coordinate system constantly, a high precision of the manipulator can be ensured.

In accordance with an aspect of the present disclosure, there is provided a coordinate calibration method of a manipulator. The manipulator is disposed on a movable carrier and operates in at least one work space. A 3D measuring device is disposed in the work space and is configured to measure a position of the manipulator. The coordinate calibration method includes steps of: (a) when the manipulator being moved to operate in the work space by the movable carrier, controlling the manipulator to move in accordance with a movement command, and utilizing the 3D measuring device to acquire at least three reference anchor points reached by the manipulator; (b) acquiring a rotation matrix and a translation vector through calculation according to the at least three reference anchor points, and acquiring a reference coordinate system through calculation according to the rotation matrix and the translation vector; (c) the manipulator being moved to leave the work space by the movable carrier, when the manipulator returning to operate in the work space, controlling the manipulator to move in accordance with the movement command, and utilizing the 3D measuring device to acquire at least three actual anchor points reached by the manipulator; (d) acquiring a rotation matrix and a translation vector through calculation according to the at least three actual anchor points, acquiring a corresponding actual coordinate system through calculation accordingly, and acquiring a coordinate compensation information through calculation by comparing the rotation matrix and the translation vector of the reference coordinate system with that of the actual coordinate system; and (e) adjusting the manipulator according to the coordinate compensation information, and maintaining the manipulator to operate in the reference coordinate system.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
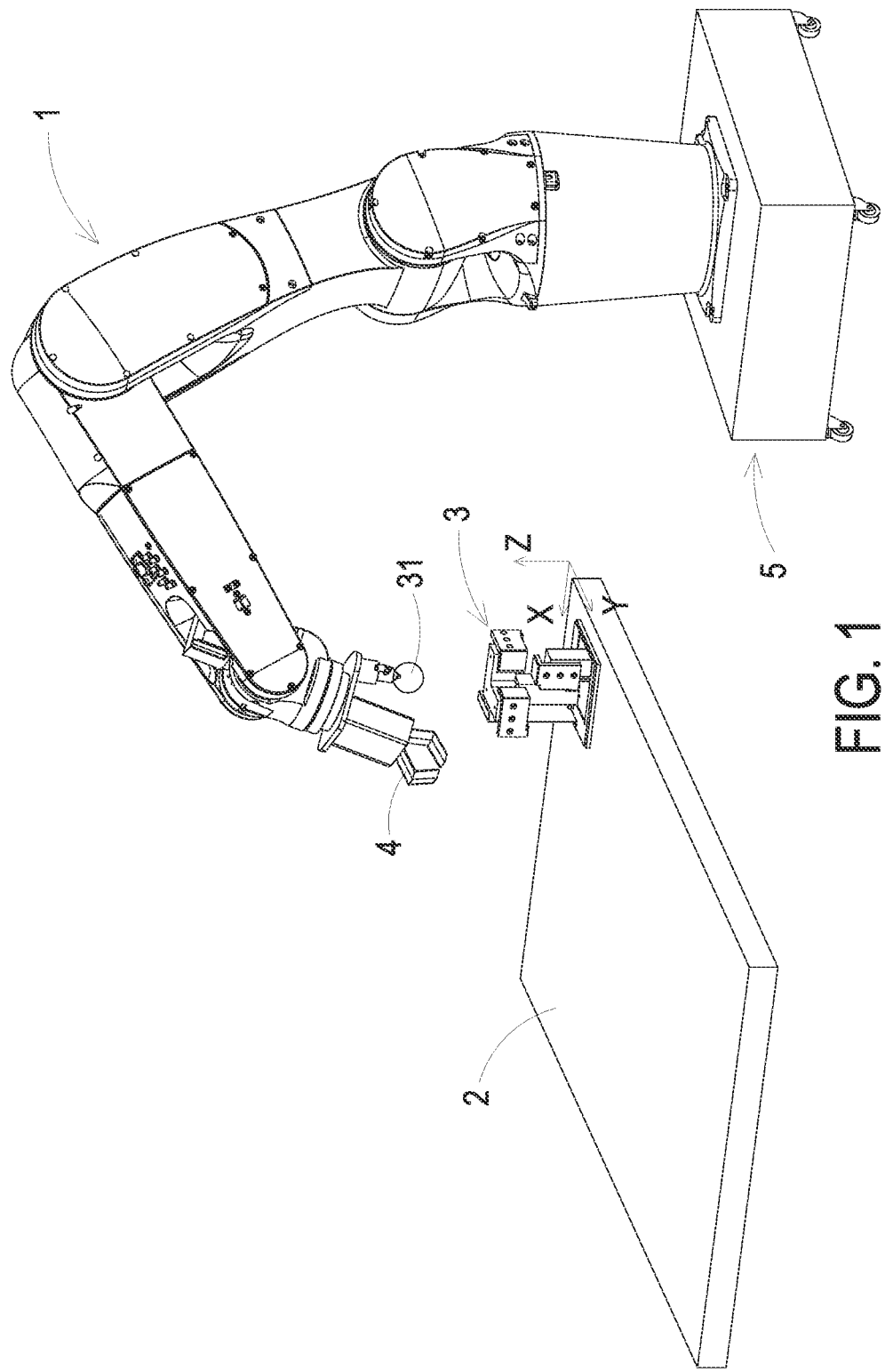
FIG. 1 is a schematic perspective view illustrating a manipulator, a work space and a 3D measuring device according to an embodiment of the present disclosure.
Figure 2:
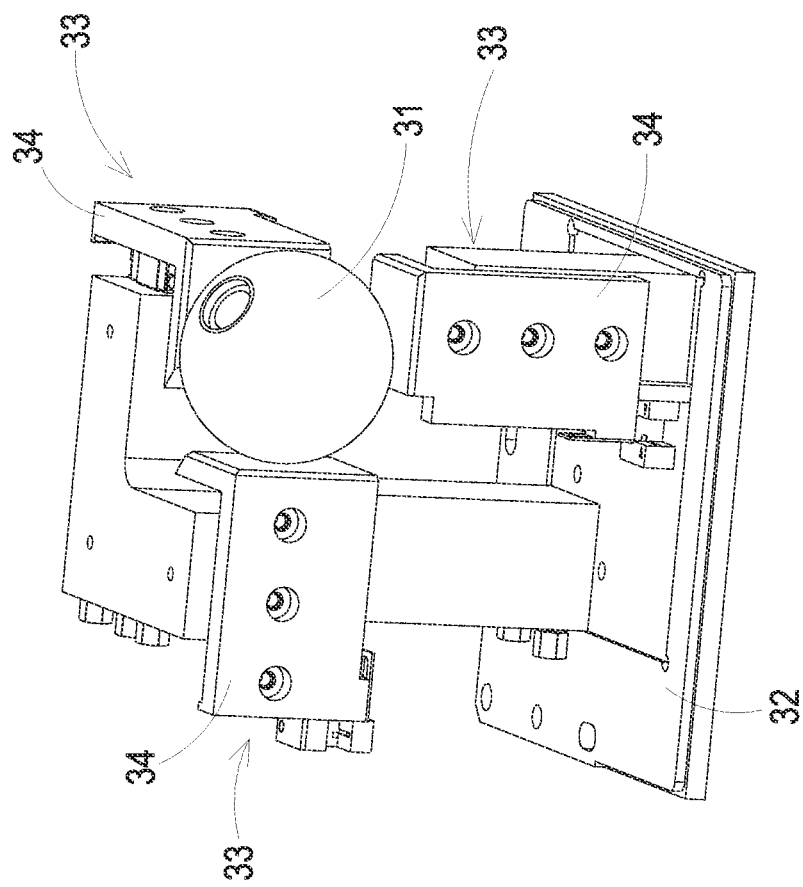
FIG. 2 is a schematic perspective view illustrating the 3D measuring device of FIG. 1.

For easily understanding the features of the present disclosure, an embodiment of the work space and the manipulator, the movable carrier and the 3D (three-dimensional) measuring device located therein are exemplified in FIGS. 1 and 2. It is noted that the possible forms of the work space and the 3D measuring device are not limited thereto. The 3D measuring device can be any measuring device fixedly disposed and capable of measuring the position or coordinate of the manipulator in the work space.

FIG. 1 is a schematic perspective view illustrating a manipulator, a work space and a 3D measuring device according to an embodiment of the present disclosure, and FIG. 2 is a schematic perspective view illustrating the 3D measuring device of FIG. 1. As shown in FIGS. 1 and 2, the 3D measuring device 3 is located in a work space. The work space is represented by a work platform 2, but not limited thereto. The 3D measuring device 3 is securely disposed on the work platform 2. The manipulator 1 is disposed on a movable carrier 5, and the manipulator 1 is driven by the movable carrier 5 to move synchronously. In a practical application, there may be some elements or devices, which are interacted with the manipulator 1 during operation, disposed on the work platform 2. For explaining the process of creating coordinate system clearly, only the 3D measuring device 3 on the work platform 2 is shown in the figures of the present disclosure. The manipulator 1 is for example but not limited to a six-axis manipulator or a SCARA manipulator. The 3D measuring device 3 is configured to measure a position or a coordinate of the manipulator 1, and the 3D measuring device 3 includes a spheroid 31, a base 32 and three measuring modules 33. The spheroid 31 is detachably assembled to the manipulator 1 and is driven by the manipulator 1 to move or rotate synchronously. The three measuring modules 33 are all disposed on the base 32, and each of the three measuring modules 33 includes a measuring structure 34 and a position sensor. The three measuring structures 34 of the three measuring modules 33 are able to move along the X-axis direction, the Y-axis direction and the Z-axis direction respectively, and the three measuring structures 34 are all contacted with the spheroid 31. The position sensor is configured to sense the moving distance of the corresponding measuring structure 34 being pushed by the spheroid 31. The position sensor is for example but not limited to be constructed of optical scale.

Figure 3:
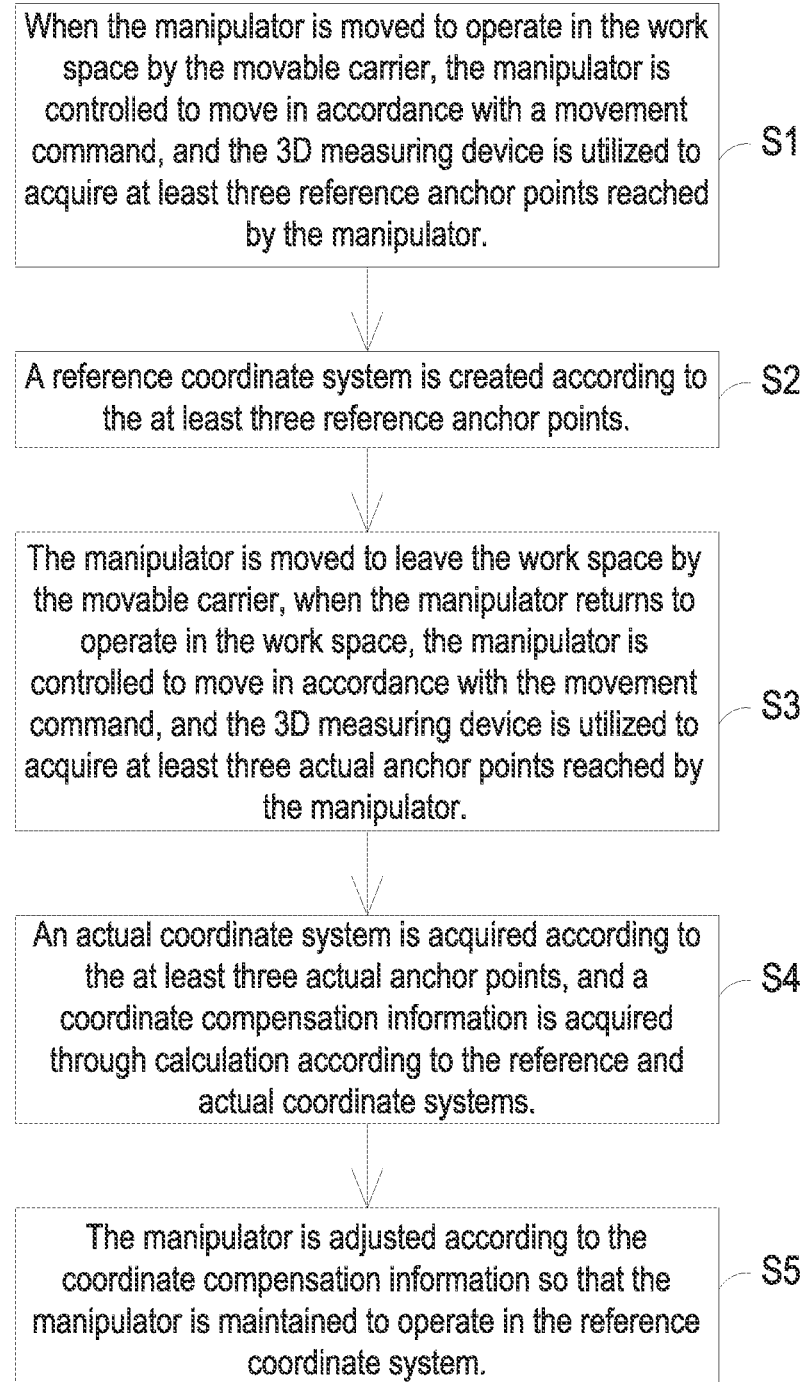
FIG. 3 is a schematic flowchart illustrating a coordinate calibration method of a manipulator according to an embodiment of the present disclosure.

Please refer to FIG. 3. FIG. 3 is a schematic flowchart illustrating a coordinate calibration method of a manipulator according to an embodiment of the present disclosure. Firstly, when the manipulator 1 is moved to operate in the work space (e.g., the work platform 2) by the movable carrier 5, the manipulator 1 is controlled to move in accordance with a movement command, and the 3D measuring device 3 is utilized to acquire at least three reference anchor points reached by the manipulator 1 (Step S1). For example but not exclusively, the movement command includes controlling the manipulator 1 to move at least three times with different operating motions. Then, a reference coordinate system is created according to the at least three reference anchor points (Step S2). Then, the manipulator 1 is moved to leave the work space by the movable carrier 5, when the manipulator 1 returns to operate in the work space, the manipulator 1 is controlled to move in accordance with the movement command, and the 3D measuring device 3 is utilized to acquire at least three actual anchor points reached by the manipulator 1 (Step S3). The number of the actual anchor points is the same as that of the reference anchor points. Afterward, an actual coordinate system is acquired according to the at least three actual anchor points, and a coordinate compensation information is acquired through calculation according to the reference coordinate system and the actual coordinate system (Step S4). Finally, the manipulator 1 is adjusted according to the coordinate compensation information so that the manipulator 1 is maintained to operate in the reference coordinate system (Step S5).

Therefore, when the manipulator 1 is moved to the work space for the first time, the reference coordinate system is created. After the reference coordinate system is created, the manipulator 1 may be moved to other work spaces or area. When the manipulator 1 returns to the work space with created reference coordinate system, the manipulator 1 can be rapidly adjusted to operate in the reference coordinate system created originally by comparing the reference coordinate system and the actual coordinate system. Accordingly, the coordinate system needs not to be created again, and the manipulator 1 needs not to be taught points again either. Consequently, the work efficiency and precision of the manipulator 1 can be greatly improved.

Please refer to FIGS. 1, 2 and 3, the three measuring structures 34 collaboratively define a measuring space by the movable distances thereof along the X-axis direction, the Y-axis direction and the Z-axis direction respectively. In the steps S1, S2 and S3 of the coordinate calibration method, the spheroid 31 is driven to move in the measuring space by the manipulator 1, and the sensing results of the three position sensors reflect the 3D coordinate of the spheroid 31. In an embodiment, in the steps S1, S2 and S3 of the coordinate calibration method, the reference anchor points and the actual anchor points are the 3D coordinates of the center of the spheroid 31 measured by the 3D measuring device 3.

Since the spheroid 31 is detachably assembled to the manipulator 1, the manipulator 1 may be assembled to the spheroid 31 for performing the coordinate calibration method shown in FIG. 3 only when there is a need of calibration. Furthermore, the manipulator 1 may be assembled to the spheroid 31 only when there is a need of measuring the anchor points. Particularly, the manipulator 1 may be assembled to the spheroid 31 during the steps S1, S2 and S3 of the coordinate calibration method only.

In an embodiment, the manipulator 1 is assembled to a tool 4, and the tool 4 is driven to operate on the work platform 2 by the manipulator 1. In the case that the manipulator 1 is assembled to the tool 4, the manipulator 1 can be assembled to the spheroid 31 of the 3D measuring device 3 simultaneously. Therefore, if the coordinate system of the manipulator 1 needs to be calibrated, the tool 4 needs not to be removed from the manipulator 1 before performing calibration. Because of that, there is no need to reinstall the tool 4 and perform the adjustment and calibration accordingly after the calibration is accomplished. Consequently, the calibration process is simplified, the time spent for calibration is reduced, and the work efficiency of the manipulator 1 is improved indirectly.

The way of acquiring the coordinate system and the coordinate compensation information is exemplified as follows.

When the manipulator 1 is moved in accordance with the movement command, the 3D measuring device is utilized to measure the 3D coordinates of the three reference anchor points. Through equations (1), (2) and (3), the unit vectors $\vec{x}$, $\vec{y}$ and $\vec{z}$ of the X axis, the Y axis and the Z axis are acquired according to the three reference anchor points $P_0$, $P_x$ and $P_y$. Accordingly, a rotation matrix R of the manipulator 1 is shown in equation (4).

$$\vec{x} = \text{unit}(\overrightarrow{P_0 - P_x}) \qquad (1)$$

$$\vec{y} = \text{unit}(\overrightarrow{P_0 - P_y}) \qquad (2)$$

$$\vec{z} = \vec{x} \times \vec{y} \qquad (3)$$

$$R = [\vec{x}\ \vec{y}\ \vec{z}] \qquad (4)$$

Afterward, a translation vector $\vec{T}$ is acquired through calculation according to the rotation matrix R, as shown in equation (5), $$\vec{T} = R \times \begin{bmatrix} P_{x0} - P_0 \\ P_{y0} - P_0 \\ P_{z0} - P_0 \end{bmatrix}, \qquad (5)$$

where $P_{x0}$, $P_{y0}$ and $P_{z0}$ are stall positions of the manipulator 1. Therefore, the reference coordinate system is created according to the rotation matrix and the translation vector. In an embodiment, the reference anchor point $P_x$ is acquired by the manipulator 1 moving along the X axis from the reference anchor point $P_0$, and the reference anchor point $P_y$ is acquired by the manipulator 1 moving along the Y axis from the reference anchor point $P_0$.

If the manipulator 1 is moved to other work spaces or areas, the manipulator 1 is controlled to move in accordance with the movement command when the manipulator 1 returns to the work space with created reference coordinate system. Meanwhile, the 3D measuring device 3 is utilized to measure the 3D coordinates of the three actual anchor points. According to above equations (1) to (5), the current rotation matrix $\hat{R}$ and the current translation vector $\hat{\vec{T}}$ of the manipulator 1 are acquired through calculation. A rotation matrix variation $\Delta R$ and a translation vector variation $\Delta T$ are acquired through calculation according to equations (6) and (7).

$$\Delta R = R^{-1}\hat{R} \qquad (6)$$

$$\Delta \vec{T} = \hat{\vec{T}} - \vec{T} \qquad (7)$$

The rotation matrix variation and the translation vector variation are regarded as the coordinate compensation information. The manipulator 1 is adjusted according to the coordinate compensation information and operates in the originally created reference coordinate system. Therefore, the manipulator 1 needs not to operate in the actual coordinate system and to be taught points again.

From the above descriptions, the present disclosure provides a coordinate calibration method of a manipulator. A reference coordinate system of a work space is created through a 3D measuring device. When the manipulator returns to the work space after temporarily leaving, an actual coordinate system is acquired through the 3D measuring device. The manipulator is adjusted according to the difference between the reference coordinate system and the actual coordinate system so that the manipulator is maintained to operate in the reference coordinate system. Accordingly, the coordinate system needs not to be created repeatedly, and the manipulator needs not to be taught points repeatedly either. Consequently, the work efficiency of the manipulator is greatly improved. Moreover, since the manipulator operates in the reference coordinate system constantly, a high precision of the manipulator can be ensured. In addition, in the case that the manipulator is assembled to the tool, the manipulator can be assembled to the spheroid of the 3D measuring device simultaneously. Therefore, if the manipulator needs to be calibrated, the tool needs not to be removed from the manipulator before performing calibration. Because of that, there is no need to reinstall the tool and perform the adjustment and calibration accordingly after the calibration is accomplished. Consequently, the calibration process is simplified, the time spent for calibration is reduced, and the work efficiency of the manipulator is improved indirectly.

While the disclosure has been described in terms of what is presently considered to be the most practical and preferred embodiments, it is to be understood that the disclosure needs not be limited to the disclosed embodiment.

What is claimed is:

1. A coordinate calibration method of a manipulator, wherein the manipulator is disposed on a movable carrier and operates in at least one work space, a 3D measuring device is disposed in the work space and is configured to measure a position of the manipulator, and the coordinate calibration method comprises steps of:
   (a) when the manipulator is moved to operate in the work space by the movable carrier, controlling the manipulator to move in accordance with a movement command, and utilizing the 3D measuring device to acquire at least three reference anchor points reached by the manipulator;
   (b) acquiring a rotation matrix and a translation vector through calculation according to the at least three reference anchor points, and acquiring a reference coordinate system through calculation according to the rotation matrix and the translation vector;
   (c) the manipulator being moved to leave the work space by the movable carrier, when the manipulator returns to operate in the work space, controlling the manipulator to move in accordance with the movement command, and utilizing the 3D measuring device to acquire at least three actual anchor points reached by the manipulator;
   (d) acquiring a rotation matrix and a translation vector through calculation according to the at least three actual anchor points, acquiring a corresponding actual coordinate system through calculation accordingly, and acquiring a coordinate compensation information through calculation by comparing the rotation matrix and the translation vector of the reference coordinate system with that of the actual coordinate system; and
   (e) adjusting the manipulator according to the coordinate compensation information, and maintaining the manipulator to operate in the reference coordinate system,
   wherein the 3D measuring device comprises:
      a spheroid detachably assembled to the manipulator and driven by the manipulator to move or rotate synchronously;
      a base; and
      three measuring modules disposed on the base, wherein each of the three measuring modules comprises a measuring structure and a position sensor, the three measuring structures of the three measuring modules move along an X-axis direction, a Y-axis direction and a Z-axis direction respectively, the three measuring structures are all contacted with the spheroid, and the position sensor is configured to sense a moving distance of the corresponding measuring structure being pushed by the spheroid,
      wherein the three measuring structures collaboratively define a measuring space by movable distances thereof along the X-axis direction, the Y-axis direction and the Z-axis direction respectively, in the steps (a), (b) and (c), the spheroid is driven to move in the measuring space by the manipulator, and the sensing results of the three position sensors reflect a 3D coordinate of the spheroid.

2. The coordinate calibration method according to claim 1, wherein the movement command comprises controlling the manipulator to move at least three times with different operating motions.

3. The coordinate calibration method according to claim 1, wherein equations of the rotation matrix of the manipulator are shown as follows:

$$\vec{x} = \text{unit}(\overrightarrow{P_0 - P_x}),$$

$$\vec{y} = \text{unit}(\overrightarrow{P_0 - P_y}),$$

$$\vec{z} = \vec{x} \times \vec{y},$$

$$R = [\vec{x}\ \vec{y}\ \vec{z}],$$

where $P_0$, $P_x$ and $P_y$ represent the three anchor points, $\vec{x}$, $\vec{y}$ and $\vec{z}$ represent unit vectors of an X axis, a Y axis and a Z axis respectively, and R represents the rotation matrix of the manipulator.

4. The coordinate calibration method according to claim 3, wherein equation of the translation vector of the manipulator is shown as follow:

$$\vec{T} = R \times \begin{bmatrix} P_{x0} - P_0 \\ P_{y0} - P_0 \\ P_{z0} - P_0 \end{bmatrix},$$

where $P_{x0}$, $P_{y0}$ and $P_{z0}$ represent stall positions of the manipulator, and $\vec{T}$ represents the translation vector of the manipulator.

5. The coordinate calibration method according to claim 4, wherein a rotation matrix variation and a translation vector variation are acquired through calculation by comparing the rotation matrix and the translation vector of the reference coordinate system with that of the actual coordinate system, the coordinate compensation information comprises the rotation matrix variation and the translation vector variation, and equations of the rotation matrix variation and the translation vector variation are shown as follows:

$$\Delta R = R^{-1} \hat{R},$$

$$\Delta \vec{T} = \vec{\hat{T}} - \vec{T},$$

where R and $\vec{T}$ represent the rotation matrix and the translation vector of the reference coordinate system respectively, $\hat{R}$ and $\vec{\hat{T}}$ represent the rotation matrix and the translation vector of the actual coordinate system respectively, $\Delta R$ represents the rotation matrix variation, and $\Delta \vec{T}$ represents the translation vector variation.

6. The coordinate calibration method according to claim 1, wherein the manipulator is assembled to a tool, the tool is driven to operate by the manipulator, and the manipulator is detachably assembled to the spheroid of the 3D measuring device when being assembled to the tool.

7. The coordinate calibration method according to claim 1, wherein the manipulator is assembled to the spheroid of the 3D measuring device during the steps (a), (b) and (c) only.

8. The coordinate calibration method according to claim 1, wherein in the steps (a), (b) and (c), the at least three reference anchor points and the at least three actual anchor points are the 3D coordinates of a center of the spheroid measured by the 3D measuring device.

9. The coordinate calibration method according to claim 1, wherein the manipulator is a six-axis manipulator or a SCARA manipulator.

* * * * *